US012621846B2

(12) United States Patent
Kalhan et al.

(10) Patent No.: US 12,621,846 B2
(45) Date of Patent: May 5, 2026

(54) RESERVATION SIGNAL FORWARDING USING 2-STAGE SIDELINK CONTROL INFORMATION (SCI)

(71) Applicants: Kyocera Corporation, Kyoto (JP);
Amit Kalhan, San Diego, CA (US);
Masato Fujishiro, Yokohama (JP);
Henry Chang, San Diego, CA (US)

(72) Inventors: Amit Kalhan, San Diego, CA (US);
Masato Fujishiro, Yokohama (JP);
Henry Chang, San Diego, CA (US)

(73) Assignee: Kyocera Corporation, Kyoto (JP)

(*) Notice: Subject to any disclaimer, the term of this patent is extended or adjusted under 35 U.S.C. 154(b) by 508 days.

(21) Appl. No.: 18/030,246

(22) PCT Filed: Sep. 30, 2021

(86) PCT No.: PCT/US2021/052809
§ 371 (c)(1),
(2) Date: Apr. 4, 2023

(87) PCT Pub. No.: WO2022/081345
PCT Pub. Date: Apr. 21, 2022

(65) Prior Publication Data
US 2023/0362957 A1 Nov. 9, 2023

Related U.S. Application Data

(60) Provisional application No. 63/091,033, filed on Oct. 13, 2020.

(51) Int. Cl.
*H04W 72/25* (2023.01)
*H04W 4/46* (2018.01)
(Continued)

(52) U.S. Cl.
CPC ............. *H04W 72/25* (2023.01); *H04W 4/46* (2018.02); *H04W 72/0446* (2013.01); *H04W 84/18* (2013.01)

(58) Field of Classification Search
CPC ...... G08G 1/0116; H04W 72/25; H04W 4/46; H04W 72/0446; H04W 84/18; H04W 76/10; H04L 1/1812
See application file for complete search history.

(56) References Cited

U.S. PATENT DOCUMENTS

2005/0276243 A1   12/2005   Sugaya et al.
2018/0084511 A1   3/2018   Wu et al.
(Continued)

*Primary Examiner* — Iqbal Zaidi

(57) ABSTRACT

The methods and systems discussed herein describe a first wireless communication device receiving reservation signals from two other wireless communication devices, each reservation signal identifying one or more time-slots reserved for data transmissions and a data priority level associated with the data transmissions. When the first wireless communication device determines that the reservation signals have at least one common identified time-slot, the first wireless communication device transmits a forwarded reservation signal, which identifies the time-slots reserved by the wireless communication device with the higher data priority level, to the wireless communication device with a lower data priority level. The wireless communication device that receives the forwarded reservation signal determines whether to transmit data during the time-slots identified in the forwarded reservation signal.

20 Claims, 5 Drawing Sheets

400   START

RECEIVE, AT A FIRST WIRELESS COMMUNICATION DEVICE (WCD) THAT IS A NODE OF A VANET FROM A SECOND WCD THAT IS ANOTHER NODE OF THE VANET, A FIRST RESERVATION SIGNAL THAT IDENTIFIES ONE OR MORE TIME-SLOTS THAT HAVE BEEN RESERVED BY THE SECOND WCD FOR DATA TRANSMISSIONS WITHIN THE VANET, THE FIRST RESERVATION SIGNAL CONTAINING AN INDICATION OF A FIRST DATA PRIORITY LEVEL ASSOCIATED WITH THE SECOND WCD DATA TRANSMISSIONS — 402

RECEIVE, AT THE FIRST WCD FROM A THIRD WCD THAT IS ANOTHER NODE OF THE VANET, A SECOND RESERVATION SIGNAL THAT IDENTIFIES ONE OR MORE TIME-SLOTS THAT HAVE BEEN RESERVED BY THE THIRD WCD FOR DATA TRANSMISSIONS WITHIN THE VANET, AT LEAST ONE OF THE IDENTIFIED TIME-SLOTS IN THE SECOND RESERVATION SIGNAL BEING THE SAME AS AT LEAST ONE OF THE IDENTIFIED TIME-SLOTS IN THE FIRST RESERVATION SIGNAL, THE SECOND RESERVATION SIGNAL CONTAINING AN INDICATION OF A SECOND DATA PRIORITY LEVEL ASSOCIATED WITH THE THIRD WCD DATA TRANSMISSIONS, THE SECOND DATA PRIORITY LEVEL BEING LOWER THAN THE FIRST DATA PRIORITY LEVEL — 404

TRANSMIT, FROM THE FIRST WCD TO THE THIRD WCD, A FORWARDED RESERVATION SIGNAL THAT IDENTIFIES THE ONE OR MORE TIME-SLOTS THAT HAVE BEEN RESERVED BY THE SECOND WCD FOR DATA TRANSMISSIONS WITHIN THE VANET SUCH THAT THE THIRD WCD DETERMINES, BASED AT LEAST PARTIALLY ON THE FORWARDED RESERVATION SIGNAL, WHETHER TO REFRAIN FROM TRANSMITTING DATA WITHIN THE ONE OR MORE TIME-SLOTS THAT HAVE BEEN RESERVED BY THE SECOND WCD FOR DATA TRANSMISSIONS — 406

(51) Int. Cl.
    *H04W 72/0446*      (2023.01)
    *H04W 84/18*      (2009.01)

(56)          References Cited

U.S. PATENT DOCUMENTS

2019/0364492 A1 * 11/2019 Azizi ..................... H04L 67/12
2020/0120458 A1    4/2020 Aldana et al.
2020/0236655 A1    7/2020 Bharadwaj et al.
2022/0039063 A1    2/2022 Sambale et al.

* cited by examiner

400

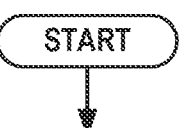

START

RECEIVE, AT A FIRST WIRELESS COMMUNICATION DEVICE (WCD) THAT IS A NODE OF A VANET FROM A SECOND WCD THAT IS ANOTHER NODE OF THE VANET, A FIRST RESERVATION SIGNAL THAT IDENTIFIES ONE OR MORE TIME-SLOTS THAT HAVE BEEN RESERVED BY THE SECOND WCD FOR DATA TRANSMISSIONS WITHIN THE VANET, THE FIRST RESERVATION SIGNAL CONTAINING AN INDICATION OF A FIRST DATA PRIORITY LEVEL ASSOCIATED WITH THE SECOND WCD DATA TRANSMISSIONS    — 402

RECEIVE, AT THE FIRST WCD FROM A THIRD WCD THAT IS ANOTHER NODE OF THE VANET, A SECOND RESERVATION SIGNAL THAT IDENTIFIES ONE OR MORE TIME-SLOTS THAT HAVE BEEN RESERVED BY THE THIRD WCD FOR DATA TRANSMISSIONS WITHIN THE VANET, AT LEAST ONE OF THE IDENTIFIED TIME-SLOTS IN THE SECOND RESERVATION SIGNAL BEING THE SAME AS AT LEAST ONE OF THE IDENTIFIED TIME-SLOTS IN THE FIRST RESERVATION SIGNAL, THE SECOND RESERVATION SIGNAL CONTAINING AN INDICATION OF A SECOND DATA PRIORITY LEVEL ASSOCIATED WITH THE THIRD WCD DATA TRANSMISSIONS, THE SECOND DATA PRIORITY LEVEL BEING LOWER THAN THE FIRST DATA PRIORITY LEVEL    — 404

TRANSMIT, FROM THE FIRST WCD TO THE THIRD WCD, A FORWARDED RESERVATION SIGNAL THAT IDENTIFIES THE ONE OR MORE TIME-SLOTS THAT HAVE BEEN RESERVED BY THE SECOND WCD FOR DATA TRANSMISSIONS WITHIN THE VANET SUCH THAT THE THIRD WCD DETERMINES, BASED AT LEAST PARTIALLY ON THE FORWARDED RESERVATION SIGNAL, WHETHER TO REFRAIN FROM TRANSMITTING DATA WITHIN THE ONE OR MORE TIME-SLOTS THAT HAVE BEEN RESERVED BY THE SECOND WCD FOR DATA TRANSMISSIONS    — 406

FIG. 4

RESERVATION SIGNAL FORWARDING USING 2-STAGE SIDELINK CONTROL INFORMATION (SCI)

CLAIM OF PRIORITY

The present application claims priority to Provisional Application No. 63/091,033, entitled "ENHANCED METHOD TO USE THE 2-STAGE SIDELINK CONTROL INFORMATION (SCI) DESIGN TO SUPPORT THE FORWARDING", filed Oct. 13, 2020, which is assigned to the assignee hereof and hereby expressly incorporated by reference in its entirety.

FIELD

This invention generally relates to wireless communications and more particularly to vehicle-to-everything (V2X) communications between wireless communication devices.

BACKGROUND

A vehicle ad-hoc network (VANET) is an autonomously created wireless network of vehicles. In some VANETs, the wireless communication devices, which are located within the vehicles of the VANET, autonomously select the time-frequency resources for data transmissions to other vehicles within the VANET. However, if the number of transmitting vehicle-to-vehicle (V2V) devices is large with respect to the resources available for data transmissions, the probability of data transmission collisions is high.

SUMMARY

The methods and systems discussed herein describe a first wireless communication device receiving reservation signals from two other wireless communication devices, each reservation signal identifying one or more time-slots reserved for data transmissions and a data priority level associated with the data transmissions. When the first wireless communication device determines that the reservation signals have at least one common identified time-slot, the first wireless communication device transmits a forwarded reservation signal, which identifies the time-slots reserved by the wireless communication device with the higher data priority level, to the wireless communication device with a lower data priority level. The wireless communication device that receives the forwarded reservation signal determines whether to transmit data during the time-slots identified in the forwarded reservation signal.

BRIEF DESCRIPTION OF THE DRAWINGS

FIG. 4 is a flowchart of an example of a method in which a first wireless communication device receives first and second reservation signals from a second and third wireless communication device, respectively. Each reservation signal includes an indication of a data priority level and identifies one or more time-slots that have been reserved by the respective second and third wireless communication devices for data transmissions. At least one of the identified time-slots in the first reservation signal is the same as at least one of the identified time-slots in the second reservation signal. The second data priority level indicated in the second reservation signal is lower than the first data priority level indicated in the first reservation signal. The first wireless communication device transmits a forwarded reservation signal that identifies the one or more time-slots that have been reserved by the second wireless communication device.

DETAILED DESCRIPTION

Figure 1A:
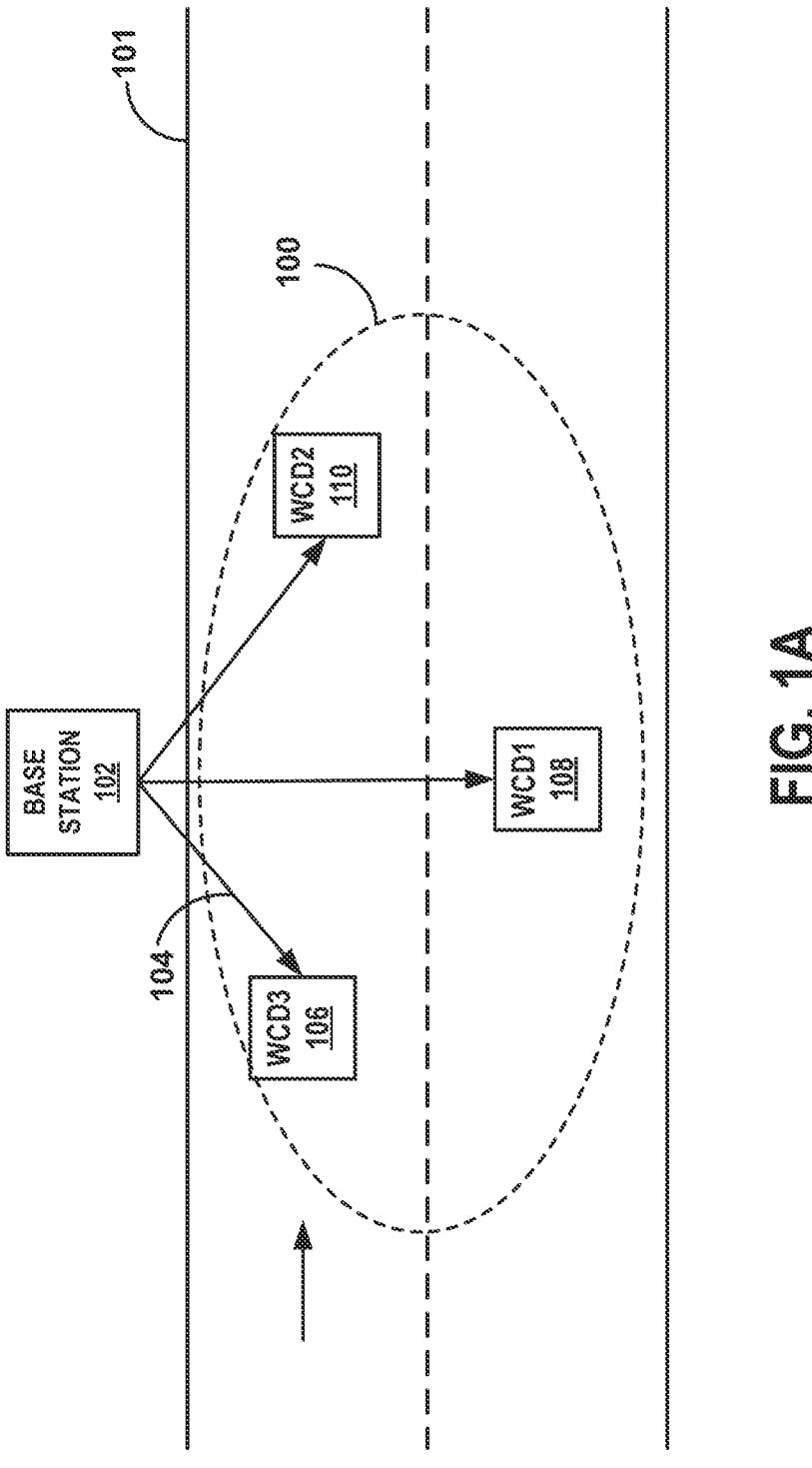
FIG. 1A is a block diagram of an example of a system in which a plurality of wireless communication devices are nodes of a vehicle ad-hoc network (VANET).

The examples discussed below are generally directed to vehicle-to-vehicle (V2V) communication between two or more vehicles that are part of a vehicle ad-hoc network (VANET). However, any of the following examples may be applied to vehicle-to-everything (V2X) communication, which is the passing of information from a vehicle to any entity that may affect the vehicle or that the vehicle may affect. For example, V2X is a vehicular communication system that incorporates other, more specific types of communication, including V2V, V2I (vehicle-to-infrastructure), V2N (vehicle-to-network), V2P (vehicle-to-pedestrian), V2D (vehicle-to-device), and V2G (vehicle-to-grid). There are two types of V2X communication technology depending on the underlying technology being used: wireless local area network (WLAN)-based V2X, and cellular-based V2X (C-V2X). Some examples of V2X protocols include Long-Term Evolution (LTE) (Rel-14) V2X Mode 4 and 5G New Radio (NR) V2X Mode 2.

In order to minimize the number of data transmission collisions in a VANET, a wireless communication device interested in transmitting data transmits a reservation signal, which is also referred to herein as a reservation channel transmission, which indicates resources to be used for the data transmission at a future time. The other wireless communication devices in the VANET receive and decode this reservation signal in order to identify the resources that will be used by the transmitting wireless communication device for future data transmissions. In order to avoid collisions, the other wireless communication devices take the resources identified in the reservation signal into account when selecting transmission resources that will be used for their respective future data transmissions.

In accordance with one example of a resource selection method, a wireless communication device that is interested in transmitting data uses long-term sensing to discover which resources are already periodically being used by one or more other wireless communication devices. When an actual data packet arrives at the wireless communication device, the wireless communication device uses short-term sensing to detect, among the remaining idle resources, an idle set of resources. In general, the sensing may be based on the successful decoding of the control channel and/or the signal-to-noise measurement of the reference signals embedded within the control/data channels above a given threshold value. The wireless communication device then transmits a reservation signal to reserve resources, which were identified as being idle, for a future data transmission.

In some cases, the reservation is indicated in a Sidelink Control Information (SCI) transmission. In other cases, the reservation is indicated in a dedicated signal. In LTE and 5G NR V2X, the reservation is indicated as part of the SCI.

Although the sensing method allows the wireless communication devices to select the unused time-slots, it is still possible for the data transmissions to collide due to the mobility of the wireless communication devices. For example, a "merging collision" occurs when a first wireless communication device moves into a region where there is already a second wireless communication device using the same time-slot as the first wireless communication device. For example, as shown in FIG. 1B, a "merging collision" would happen when the accelerating wireless communication device 106 is about to enter the coverage area 111 of wireless communication device 110 and both wireless communication devices 106, 110 happen to be using the same time-slot, $t_{n+m}$, for their respective data transmissions. The sensing method, described above, does not help avoid the "merging collision" in this scenario because wireless communication device 106 will not detect the out-of-range wireless communication device 110.

The methods and systems discussed herein describe a first wireless communication device transmitting a forwarded reservation signal, which identifies one or more time-slots that have been reserved by a second wireless communication device, to avoid "merging collisions." More specifically, the first wireless communication device receives a first reservation signal from a second wireless communication device, which identifies one or more time-slots that have been reserved by the second wireless communication device for data transmissions. The first reservation signal contains an indication of a first data priority level associated with the second wireless communication device data transmissions.

The first wireless communication device also receives a second reservation signal from a third wireless communication device, which identifies one or more time-slots that have been reserved by the third wireless communication device for data transmissions. The second reservation signal contains an indication of a second data priority level associated with the third wireless communication device data transmissions. At least one of the identified time-slots in the second reservation signal is the same as at least one of the identified time-slots in the first reservation signal.

If the data to be transmitted by the third wireless communication device has a lower priority level than the data to be transmitted by the second wireless communication device (e.g., the second data priority level is lower than the first data priority level), the first wireless communication device transmits a forwarded reservation signal that identifies the one or more time-slots reserved by the second wireless communication device. Based at least partially on the forwarded reservation signal, the third wireless communication device determines whether to refrain from transmitting data within the one or more time-slots that have been reserved by the second wireless communication device for data transmissions. If the third wireless communication device determines to refrain from transmitting, the third wireless communication device cancels its upcoming data transmissions and starts the process of resource reselection (e.g., selecting a different set of one or more time-slots) for its data transmissions.

Alternatively, if the data to be transmitted by the third wireless communication device has a higher priority level than the data to be transmitted by the second wireless communication device, the first wireless communication device transmits a forwarded reservation signal that identifies the one or more time-slots reserved by the third wireless communication device. In other examples, the first wireless communication device transmits the forwarded reservation signal if a received power value of the first reservation signal is within a pre-defined received power range.

For the examples described herein, it is assumed that the wireless communication devices are equipped with a Global Positioning System (GPS) receiver and that synchronization among the wireless communication devices is performed using the one pulse-per-second (1PPS) signal provided by the GPS receiver. Using the 1PPS signal, the wireless communication devices obtain common reference timing, synchronized with each other and become aware of the frame-boundaries. Each frame consists of a constant number of fixed duration time-slots (e.g., the duration of each frame is 100 milliseconds long where each time-slot within the frame is 0.5 ms, resulting in 200 time-slots per frame). As a result, every wireless communication device has the knowledge of the frame-number and time-slot-number.

Figure 1B:
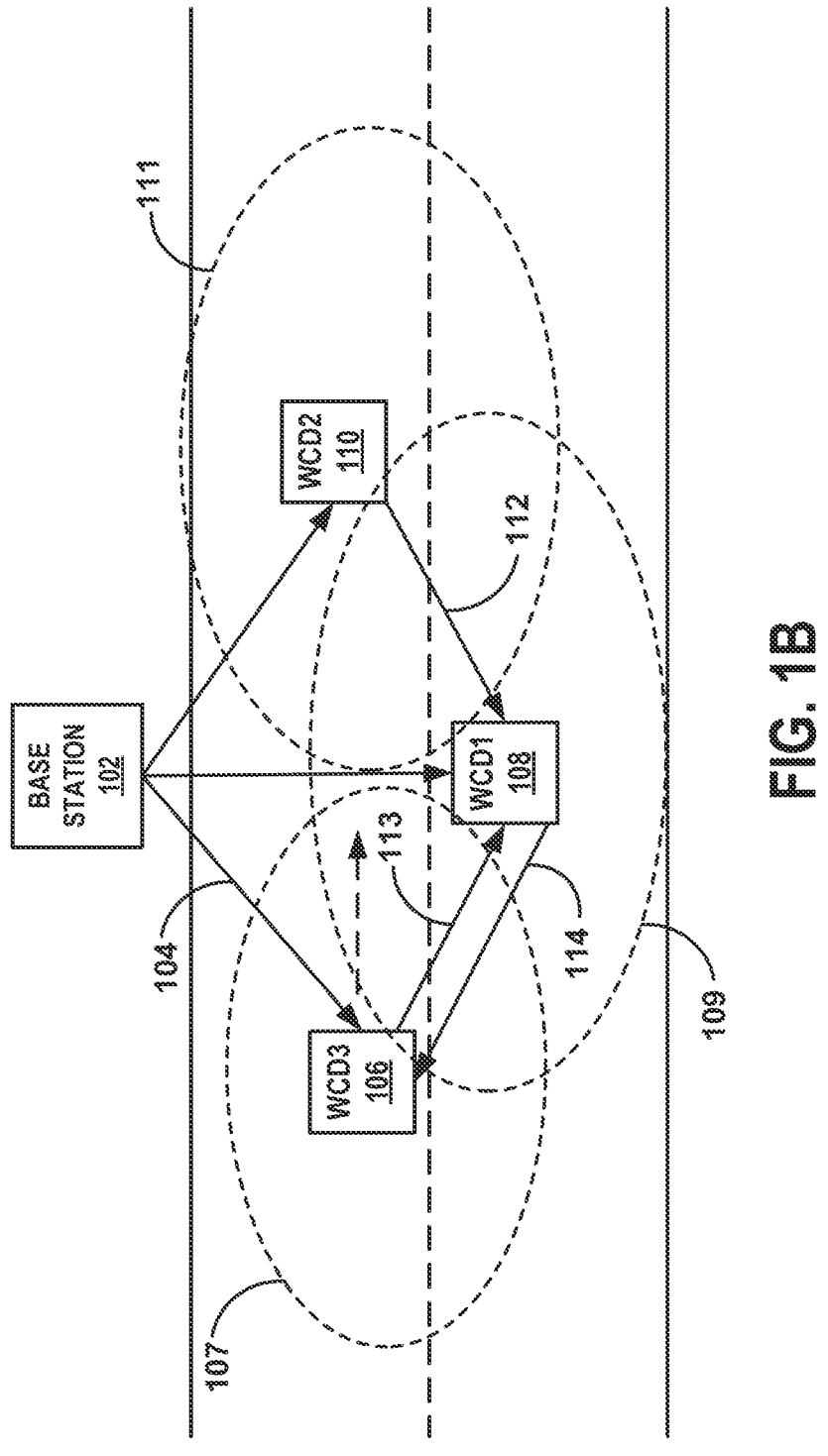
FIG. 1B is a block diagram of an example of a system in which the wireless communication devices of FIG. 1A are using reservation signal forwarding to avoid data transmission collisions in the VANET.

FIG. 1A is a block diagram of an example of a system in which a plurality of wireless communication devices are nodes of a vehicle ad-hoc network (VANET). For the example of FIG. 1A, VANET 100 is located on roadway 101 and includes first wireless communication device, WCD1, 108, second wireless communication device. WCD2, 110, and third wireless communication device, WCD3, 106. In other examples, VANET 100 may have a different number of wireless communication devices than that shown in FIG. 1A.

VANET 100 is wirelessly connected to a radio access network (not shown) via an infrastructure communication node (e.g., base station 102 or a road side unit (RSU)), which provides various wireless services to one or more of the wireless communication devices that are part of VANET 100. For the example shown in FIG. 1A. VANET 100 operates in accordance with at least one revision of the 3rd Generation Partnership Project Long Term Evolution (3GPP LTE) communication specification. In other examples, VANET 100 may operate in accordance with other communication specifications.

In the interest of clarity and brevity, only one infrastructure communication node (e.g., base station 102) is shown in FIG. 1A. However, in other examples, any suitable number of infrastructure communication nodes may be utilized by VANET 100 in order to obtain/maintain communication with the network. For the example shown in FIG. 1A, base station 102, sometimes referred to as eNodeB or eNB, communicates with wireless communication devices 106, 108, 110 via wireless communication link 104. As referenced earlier, the infrastructure communication node is a road side unit (RSU), in other examples.

For the example shown in FIG. 1A, wireless communication link 104 is shown as a broadcast downlink signal from base station 102 to wireless communication devices 106, 108, 110. Wireless communication devices 106, 108, 110 are also capable of transmitting uplink signals (not shown) to base station 102. In the example of FIG. 1A, wireless communication devices 106, 108, 110 are each integrated into a vehicle as an onboard unit (OBU). In other examples, one or more of wireless communication devices 106, 108, 110 may simply be user equipment (UE) devices that are located within a vehicle. Some examples of user equipment devices include: a mobile phone, a transceiver modem, a personal digital assistant (PDA), or a tablet, for example. Each wireless communication device 106, 108, 110 that is connected to VANET 100 is considered to be a node of VANET 100. As indicated by the arrow in FIG. 1A, the vehicles in which wireless communication devices 106, 108, 110 are located are traveling from left to right on roadway 101.

Figure 2A:
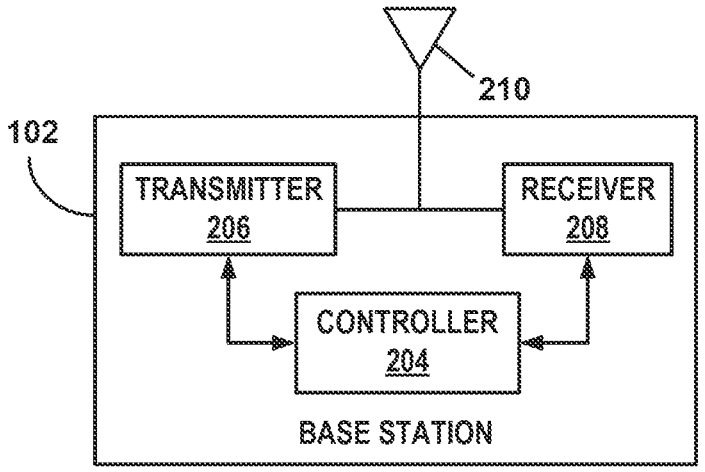
FIG. 2A is a block diagram of an example of the base station shown in FIG. 1A.

Base station 102 is connected to the network through a backhaul (not shown) in accordance with known techniques. As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of the downlink signal 104 and can apply any one of a plurality of modulation orders. The demodulator demodulates any uplink signals received at base station 102 in accordance with one of a plurality of modulation orders.

As mentioned above, base station 102 provides (1) various wireless services to one or more wireless communication devices 106, 108, 110, and (2) network connectivity to VANET 100. Base station 102 provides these services and connectivity by transmitting downlink signal 104, via transmitter 206 and antenna 210, to wireless communication devices 106, 108, 110. In the example of FIG. 1A, the downlink signal 104 is transmitted in a System Information Block (SIB) message that is broadcast to all wireless communication devices 106, 108, 110 that are nodes of VANET 100. Although not explicitly shown in FIG. 1A, base station 102 is capable of receiving uplink signals, via antenna 210 and receiver 208, from wireless communication devices 106, 108, 110.

Figure 2B:
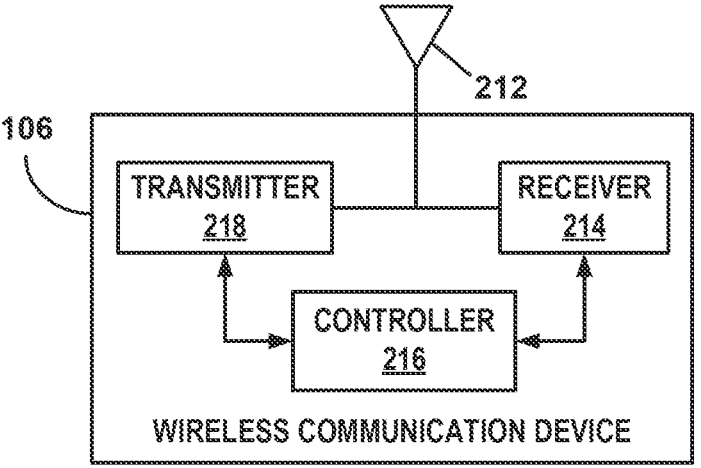
FIG. 2B is a block diagram of an example of a wireless communication device shown in FIG. 1A.

As shown in FIG. 2B, wireless communication device 106 comprises controller 216, transmitter 218, and receiver 214, as well as other electronics, hardware, and code. Although FIG. 2B specifically depicts the circuitry and configuration of wireless communication device 106, the same wireless communication device circuitry and configuration is utilized for wireless communication devices 108, 110 in VANET 100. Wireless communication device 106 is any fixed, mobile, or portable equipment that performs the functions described herein. The various functions and operations of the blocks described with reference to wireless communication device 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a wireless communication device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the wireless communication device functions. The required components may depend on the particular functionality required by the wireless communication device.

Transmitter 218 includes a modulator (not shown), and receiver 214 includes a demodulator (not shown). The modulator can apply any one of a plurality of modulation orders to modulate the signals to be transmitted as uplink signals (not shown). The demodulator demodulates the downlink signals 104 in accordance with one of a plurality of modulation orders.

In the example shown in FIG. 2B, transmitter 218 is configured to transmit a forwarded reservation signal 114 (shown in FIG. 1B) in a second stage of a 2-stage Sidelink Control Information (SCI) transmission. One advantage of sending a 2-stage control channel is to split the SCI into two-stages. The first stage contains all the necessary control information for the decoding-based sensing to do resource allocation. The second stage contains the control information that a receiving wireless communication device 106 can use to demodulate and decode the associated data channel. All receiving wireless communication devices decode both the first and second SCI stages.

In some examples, transmitter 218 is configured to modulate and encode the second stage of the 2-stage SCI transmission in accordance with a same modulation and coding scheme (MCS) used to modulate and encode the first stage of the 2-stage SCI transmission. In other examples, transmitter 218 is configured to modulate and encode the second stage of the 2-stage SCI transmission in accordance with a most robust modulation and coding scheme available to transmitting wireless communication device 108. For example, a transmitting wireless communication device may have a plurality of MCS that are available for it to use to modulate and encode a signal, depending on the channel conditions between the transmitting wireless communication device and one or more receiving wireless communication devices. A more robust MCS will increase the likelihood of successful signal transmissions in poor channel conditions, which could be associated with signal obstructions and/or interfering transmissions.

In the example shown in FIG. 1B, there is a possibility of a "merging collision" between wireless communication device 106 and wireless communication device 110. Direct communication of a reservation signal (e.g., reservation channel transmission) or reservation as a part of the SCI between wireless communication devices 106 and 110 is not possible since coverage area 107 of wireless communication device 106 cannot reach wireless communication device 110. Similarly, coverage area 111 of wireless communication device 110 cannot reach wireless communication device 106. However, coverage area 109 of wireless communication device 108 can reach both wireless communication device 106 and wireless communication device 110.

As wireless communication device 106 accelerates (e.g., from left to right, as shown by the dashed arrow in FIG. 1B) and gets closer to wireless communication device 110, there is a possibility that a "merging collision" will occur if both wireless communication devices 106, 110 attempt to use a same time-slot for data transmissions. In order to reduce the likelihood of a "merging collision," wireless communication device 110 transmits a reservation signal 112 to wireless communication device 108. Reservation signal 112 identifies one or more time-slots, including time-slot $t_{n+m}$, that have been reserved by wireless communication device 110 for data transmissions within VANET 100. Reservation signal 112 also contains an indication of a data priority level associated with data transmissions from wireless communication device 110.

Wireless communication device 106 also transmits a reservation signal 113 to wireless communication device 108. Reservation signal 113 identifies one or more time-slots, including time-slot $t_{n+m}$, that have been reserved by wireless communication device 106 for data transmissions within VANET 100, at least one of the identified time-slots (e.g., $t_{n+m}$) in reservation signal 113 being the same as at least one of the identified time-slots in reservation signal 112. Reservation signal 113 also contains an indication of a data priority level associated with data transmissions from wireless communication device 106. In the example shown in FIG. 1B, the data priority level associated with data transmissions from wireless communication device 106 is lower than the data priority level associated with data transmissions from wireless communication device 110.

Since at least one of the identified time-slots (e.g., $t_{n+m}$) in reservation signal 113 is the same as at least one of the identified time-slots in reservation signal 112 and the data priority level associated with data transmissions from wireless communication device 106 is lower than the data priority level associated with data transmissions from wireless communication device 110, wireless communication device 108 transmits, to wireless communication device 106, a forwarded reservation signal 114 that identifies the one or more time-slots that have been reserved by wireless communication device 110 for data transmissions within the VANET 100.

In the example shown in FIG. 1B, wireless communication device 108 transmits (e.g., broadcasts) forwarded reservation signal 114 to other wireless communication devices in VANET 100. In some examples, wireless communication device 108 transmits forwarded reservation signal 114 if a received power value of the reservation signal 112 is within a pre-defined received power range.

Wireless communication device 106 receives forwarded reservation signal 114 that was transmitted from wireless communication device 108. In some examples, the forwarded reservation signal 114 specifies a destination (e.g., intended recipient) for the forwarded reservation signal 114. For the example shown in FIG. 1B, the forwarded reservation signal 114 may specify a destination identifier (ID) of wireless communication device 106 in either the SCI or in a Media Access Control (MAC) header.

Based at least partially on the forwarded reservation signal 114, wireless communication device 106 determines whether to refrain from transmitting data within the one or more time-slots that have been reserved by the wireless communication device 110 for data transmissions. If wireless communication device 106 refrains from transmitting and starts the process of selecting an unused time-slot, the "merging collision" is avoided.

In some examples, reservation signal 112 and/or forwarded reservation signal 114 comprise one or more of the following: reservations for multiple time-slots, Global Positioning System (GPS) information, a zone identifier (zone ID), a number of time-slots reserved information, a cell identifier (cell ID), a group identifier (group ID), a frame-offset, and a subframe-offset. Reservations for multiple time-slots refers to examples in which a single reservation signal or forwarded reservation signal identifies a plurality of time-slots that have been reserved for data transmissions. The GPS information includes, for example, information such as a wireless communication device's geo-location, speed, heading, and zone identifier. The zone identifier (zone ID) identifies a zone in which a wireless communication device is located. A number of time-slots reserved information refers to examples in which a single reservation signal or forwarded reservation signal contains a number (e.g., 3 time-slots) that indicates how many time-slots are being reserved by that particular reservation signal or forwarded reservation signal. A cell identifier (cell ID) identifies a cell that is serving a wireless communication device. A group identifier (group ID) identifies a group to which a wireless communication device belongs. The frame-offset indicates the frame-offset being used by a wireless communication device. The subframe-offset indicates the subframe-offset being used by a wireless communication device. Inclusion of one or more of the foregoing items in reservation signal 112 and/or forwarded reservation signal 114 advantageously provides information when the wireless communication devices are served by different operators and/or by different base stations. For example, each base station could have a different frame numbering. Thus, the wireless communication devices can take information such as the cell ID and the offset into account to identify the reserved time-slots from a wireless communication device served by a different base station.

In some examples, the physical format of reservation signal 112 is hard coded. In other examples, the physical format of reservation signal 112 is configured via higher layer (e.g., Radio Resource Control) signaling. In other examples, the reserved time-slots are identified in a control channel of the reservation signal 112. In still further examples, the reserved time-slots are identified in a control channel of the forwarded reservation signal 114.

In some examples, a data transmitting wireless communication device 110 may reserve resources for its future data transmissions in the SCI of a current data transmission, as mentioned above in connection with LTE/5G NR V2X. Similarly, the reservation forwarding wireless communication device 108 has the option to forward the reservation in the SCI of its own current data transmission.

Alternatively, the forwarding wireless communication device 108 may send forwarded reservation data as a data transmission, where the reservation information (e.g., regarding the reserved time-slots) is transmitted in the Physical Sidelink Shared Channel (PSSCH). In these cases, the reservation data may be allocated a separate Logical Channel identifier (LCID) to separate the traffic data from the control data and so that the reservation data is processed in the application layer (V2X layer) of the receiving wireless communication device 106. In this manner, wireless communication device 106 can decode the data to obtain the reservation information.

In some examples, wireless communication device 108 determines that wireless communication device 108 should forward reservation signal 112 from wireless communication device 110 as forwarded reservation signal 114. For example, if wireless communication device 108 is located near an edge of coverage area 111 associated with wireless communication device 110, then wireless communication device 108 determines that wireless communication device 108 should forward reservation signal 112 from wireless communication device 110 as forwarded reservation signal 114. In some examples, wireless communication device 108 determines that it is located near an edge of coverage area 111 associated with wireless communication device 110 by determining whether a received power value of reservation signal 112, as measured at wireless communication device 108, is below a pre-defined threshold value. In other examples, wireless communication device 108 determines that it is located near an edge of coverage area 111 associated with wireless communication device 110 based, at least partially, on location information associated with the wireless communication device 110. In some instances, wireless communication device 108 receives the location information (e.g., GPS information and/or zone ID) associated with the wireless communication device 110 in reservation signal 112. In other instances, wireless communication device 108 could already be in communication with wireless communication device 110 such that wireless communication device 108 is already aware of the location of wireless communication device 110.

In other examples, wireless communication device 108 autonomously re-broadcasts updates to a previously forwarded reservation signal 114. For example, assume that reservation signal 112 and forwarded reservation signal 114 both identify a plurality of time-slots (e.g., TA, TB, and Tc) that are reserved by wireless communication device 110.

Upon determining that one or more additional time-slots should be reserved for upcoming data transmissions, wireless communication device 110 transmits an updated reservation signal that additionally reserves time-slot TD. In response to the updated reservation signal, wireless communication device 108 will transmit an updated forwarded reservation signal that identifies one or more newly reserved time-slots (e.g., TD), which have been reserved by wireless communication device 110 for data transmissions within the VANET. Thus, in this example, the updated forwarded reservation signal, which identifies TD, is transmitted after transmission of forwarded reservation signal 114 and before the occurrence of the one or more time-slots identified in the updated forwarded reservation signal. In some examples, the number of time-slots reserved information (e.g., the number of reserved time-slots) is included in reservation signal 112 transmitted from wireless communication device 110.

In other examples, wireless communication device 108 may transmit an update to a previously forwarded reservation signal 114 in response to receiving an updated reservation signal from wireless communication device 110 that indicates that wireless communication device 110 no longer requires all of the time-slots that were previously identified in reservation signal 112. For example, assume that reservation signal 112 and forwarded reservation signal 114 both identify a plurality of time-slots (e.g., TA, TB, and Tc) that are reserved by wireless communication device 110. Upon determining that time-slot Tc is no longer needed, wireless communication device 110 transmits an updated reservation signal to wireless communication device 108. Based on the updated reservation signal, wireless communication device 108 transmits an updated forwarded reservation signal, after wireless communication device 110 has transmitted data during time-slot TA, which identifies time-slot TB but not time-slot Tc as being reserved by wireless communication device 110. In this manner, the updated reservation signal effectively releases time-slot Tc to be utilized by another wireless communication device in the VANET.

Once wireless communication device 108 determines that it should forward reservation signal 112 as forwarded reservation signal 114, it is important that wireless communication device 108 transmits forwarded reservation signal 114 before the usefulness of forwarded reservation signal 114 expires. Thus, transmitter 218 of wireless communication device 108 is configured to transmit the forwarded reservation signal 114 before the one or more time-slots (e.g., $t_{n+m}$) that have been reserved by wireless communication device 110 for data transmissions. In some examples, transmitter 218 of wireless communication device 108 is configured to transmit the forwarded reservation signal 114 an integer number, k, of time-slots (e.g., $t_{n+m}$-k) before the one or more time-slots that have been reserved by wireless communication device 110 for data transmissions. In other examples, transmitter 218 of wireless communication device 108 is configured to transmit the forwarded reservation signal 114 based, at least partially, on an estimated time required for wireless communication device 106 to receive and decode the forwarded reservation signal 114.

Figure 3:
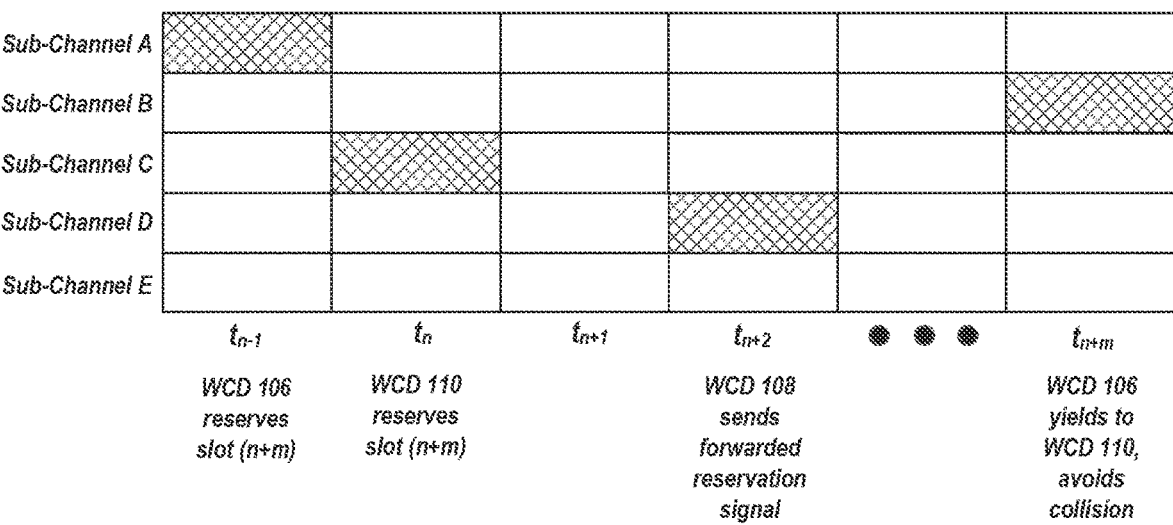
FIG. 3 is a diagram of an example of a time-frequency space showing the reservation signals and the forwarded reservation signal that are transmitted in FIG. 1B.

Optimally, wireless communication device 108 will transmit forwarded reservation signal 114 in the very next time-slot after the time-slot in which reservation signal 112 was transmitted. However, the next time-slot may not be available since it is likely that another wireless communication device will be using the next time-slot. Thus, in some examples, wireless communication device 108 will transmit forwarded reservation signal 114 in a next available time-slot. FIG. 3, discussed more fully below, shows one example of the timing of the transmission of the reservation signals and forwarded reservation signal in relation to each other and to the reserved time-slot.

In other examples, transmitter 218 of wireless communication device 108 is configured to transmit the forwarded reservation signal 114 even when wireless communication device 108 does not have data to transmit beyond that contained in the forwarded reservation signal 114. For example, transmitter 218 of wireless communication device 108 may be configured to transmit the forwarded reservation signal 114 even when wireless communication device 108 does not have data to transmit beyond that contained in the forwarded reservation signal 114, based on a network-configured data traffic condition threshold. In some examples, the network-configured data traffic condition threshold is provided to one or more of the wireless communication devices of the VANET via downlink signals 104.

One example of such a network-configured data traffic condition threshold is a Channel Busy Rate (CBR), which is a measure of traffic congestion. Thus, if the CBR is below a threshold, which indicates less traffic, then a wireless communication device 108 is allowed to transmit a forwarded reservation signal even when the wireless communication device 108 has no data of its own to transmit.

FIG. 3 is a diagram of an example of a time-frequency space showing the reservation signals and the forwarded reservation signal that are transmitted in FIG. 1B. For the example shown in FIG. 3, time-frequency domain 300 is provided where time is represented as slots, t, on the horizontal axis and frequency is represented as frequency sub-channels on the vertical axis. Each box in the 5×6 grid of time-frequency domain 300 represents a time-slot that has both a corresponding slot and sub-channel.

In the example shown in FIG. 3, wireless communication device 106 transmits reservation signal 113 in Sub-channel A at time $t_{n-1}$ (represented by cross-hatching within the corresponding time-slot). Reservation signal 113 reserves time-slot $t_{n+m}$ for wireless communication device 106 to utilize for data transmissions within the VANET. Wireless communication device 110 transmits reservation signal 112 in Sub-channel C at time $t_n$. Reservation signal 112 reserves time-slot $t_{n+m}$ for wireless communication device 110 to utilize for data transmissions within the VANET.

After receiving reservation signals 112, 113, wireless communication device 108 determines that reservation signals 112, 113 both identify at least one common time-slot (e.g., $t_{n+m}$). Since the data priority level indicated in reservation signal 113 is lower than the data priority level indicated in reservation signal 112, wireless communication device 108 transmits a forwarded reservation signal 114 to wireless communication device 106 in Sub-channel D at time $t_{n+2}$ so that wireless communication device 106 can determine whether to refrain from transmitting data during the $t_{n+m}$ time-slot. In other examples, wireless communication device 108 can transmit the forwarded reservation signal 114 in any other suitable time-slot. For example, wireless communication device 108 could transmit the forwarded reservation signal 114 as early as the $t_{n+1}$ time-slot or any other time-slot that occurs before the $t_{n+m}$ time-slot.

In some examples, if both wireless communication devices 106, 110 transmit reservation signals indicating the same data priority level, wireless communication device 108 must determine the correct course of action, based on the network configuration. For example, wireless communication device 108 may determine not to transmit a forwarded reservation signal, which would result in a collision such that wireless communication devices 106, 110 would need to perform a resource reselection procedure in order to retransmit their data. In other examples, the process by which wireless communication device 108 determines whether to transmit a forwarded reservation signal and, if so, which wireless communication device will be the intended recipient, may be based on wireless communication device implementation.

Although the foregoing discussion describes multiple wireless communication devices reserving a same transmission resource in terms of reserving a same time-slot, it should be appreciated that in some instances multiple wireless communication devices may be able to reserve a same time-slot but a different sub-channel on that same time-slot for a future data transmission. Thus, the foregoing discussion advantageously provides devices, systems, and methods for preventing merging collisions in the event that multiple wireless communication devices reserve the same sub-channel during the same time-slot for future data transmissions.

FIG. 4 is a flowchart of an example of a method in which a first wireless communication device receives first and second reservation signals from a second and third wireless communication device, respectively. Each reservation signal includes an indication of a data priority level and identifies one or more time-slots that have been reserved by the respective second and third wireless communication devices for data transmissions. At least one of the identified time-slots in the first reservation signal is the same as at least one of the identified time-slots in the second reservation signal. The second data priority level indicated in the second reservation signal is lower than the first data priority level indicated in the first reservation signal. The first wireless communication device transmits a forwarded reservation signal that identifies the one or more time-slots that have been reserved by the second wireless communication device.

The method 400 begins at step 402 with receiving, at first wireless communication device 108, which is a node of VANET 100, from second wireless communication device 110, which is another node of VANET 100, first reservation signal 112 that identifies one or more time-slots that have been reserved by second wireless communication device 110 for data transmissions within VANET 100. The first reservation signal 112 contains an indication of a first data priority level associated with the second wireless communication device data transmissions. At step 404, first wireless communication device 108 receives, from third wireless communication device 106, which is another node of VANET 100, second reservation signal 113 that identifies one or more time-slots that have been reserved by third wireless communication device 106 for data transmissions within VANET 100, at least one of the identified time-slots in the second reservation signal 113 being the same as at least one of the identified time-slots in the first reservation signal 112. The second reservation signal 113 contains an indication of a second data priority level associated with the third wireless communication device data transmissions, the second data priority level being lower than the first data priority level. At step 406, first wireless communication device 108 transmits forwarded reservation signal 114 to the third wireless communication device 106 that identifies one or more time-slots that have been reserved by second wireless communication device 110 for data transmissions within VANET 100 such that third wireless communication device 106 determines, based at least partially on the forwarded reservation signal 114, whether to refrain from transmitting data within the one or more time-slots that have been reserved by the second wireless communication device 110 for data transmissions. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A first wireless communication device, the first wireless communication device comprising:
   a receiver configured to:
      receive, from a second wireless communication device, a first reservation signal that identifies one or more first resources that have been reserved by the second wireless communication device for data transmissions, the first reservation signal containing an indication of a first data priority level associated with the second wireless communication device data transmissions, and
      receive, from a third wireless communication device, a second reservation signal that identifies one or more second resources that have been reserved by the third wireless communication device for data transmissions, at least one of the identified second resources in the second reservation signal being the same as at least one of the identified first resources in the first reservation signal, the second reservation signal containing an indication of a second data priority level associated with the third wireless communication device data transmissions, the second data priority level being lower than the first data priority level; and
   a transmitter configured to transmit, to the third wireless communication device, a signal that indicates the one or more second resources are reserved by another wireless communication device such that the third wireless communication device reselects, based at least partially on the signal, one or more unused resources for data transmissions.

2. The first wireless communication device of claim 1, wherein the transmitter is further configured to transmit the signal before the one or more first resources that have been reserved by the second wireless communication device for data transmissions.

3. The first wireless communication device of claim 2, wherein the transmitter is further configured to transmit the signal an integer number of time-slots before the one or more first resources that have been reserved by the second wireless communication device for data transmissions.

4. The first wireless communication device of claim 2, wherein the transmitter is further configured to transmit the signal based, at least partially, on an estimated time required for the third wireless communication device to receive and decode the signal.

5. The first wireless communication device of claim 1, wherein the transmitter is further configured to transmit the signal in response to the first wireless communication device having no data to transmit beyond that contained in the signal.

6. The first wireless communication device of claim 5, wherein the transmitter is configured to transmit the signal in response to the first wireless communication device having no data to transmit beyond that contained in the signal, based on a network-configured data traffic condition threshold.

7. The first wireless communication device of claim 1, wherein the transmitter is further configured to transmit the signal in a second stage of a 2-stage Sidelink Control Information (SCI) transmission.

8. The first wireless communication device of claim 7, wherein the transmitter is further configured to modulate and encode the second stage of the 2-stage SCI transmission in accordance with a most robust modulation and coding scheme available to the first wireless communication device.

9. The first wireless communication device of claim 7, wherein the transmitter is further configured to modulate and encode the second stage of the 2-stage SCI transmission in accordance with a same modulation and coding scheme used to modulate and encode a first stage of the 2-stage SCI transmission.

10. The first wireless communication device of claim 1, wherein the transmitter is further configured to transmit the signal as a data transmission in a Physical Sidelink Shared Channel.

11. A first wireless communication device, the first wireless communication device comprising:
   a transmitter configured to transmit, to a second wireless communication device, a first reservation signal that identifies one or more first resources that have been reserved by the first wireless communication device for data transmissions, the first reservation signal containing an indication of a first data priority level associated with the first wireless communication device data transmissions;
   a receiver configured to receive, from the second wireless communication device, a signal sent in response to a determination that at least one of the identified first resources in the first reservation signal is the same as one or more second resources identified in a second reservation signal received at the second wireless communication device from a third wireless communication device, the one or more identified second resources in the second reservation signal reserved by the third wireless communication device for data transmissions, the second reservation signal containing an indication of a second data priority level associated with the third wireless communication device data transmissions, the second data priority level being higher than the first data priority level, the signal indicating the one or more first resources are reserved by another wireless communication device; and
   a controller configured to reselect, based at least partially on the signal, one or more unused resources for data transmissions.

12. The first wireless communication device of claim 11, wherein the receiver is further configured to receive the signal in a second stage of a 2-stage Sidelink Control Information (SCI) transmission.

13. The first wireless communication device of claim 12, wherein the receiver is further configured to demodulate and decode the second stage of the 2-stage SCI transmission in accordance with a most robust modulation and coding scheme available to the first wireless communication device.

14. The first wireless communication device of claim 12, wherein the receiver is further configured to demodulate and decode the second stage of the 2-stage SCI transmission in accordance with a same modulation and coding scheme used to demodulate and decode a first stage of the 2-stage SCI transmission.

15. A method performed at a first wireless communication device, the method comprising:

receiving, from a second wireless communication device, a first reservation signal that identifies one or more first resources that have been reserved by the second wireless communication device for data transmissions, the first reservation signal containing an indication of a first data priority level associated with the second wireless communication device data transmissions;

receiving, from a third wireless communication device, a second reservation signal that identifies one or more second resources that have been reserved by the third wireless communication device for data transmissions, at least one of the identified second resources in the second reservation signal being the same as at least one of the identified first resources in the first reservation signal, the second reservation signal containing an indication of a second data priority level associated with the third wireless communication device data transmissions, the second data priority level being lower than the first data priority level; and transmitting, to the third wireless communication device, a signal that indicates the one or more second resources are reserved by another wireless communication device such that the third wireless communication device reselects, based at least partially on the signal, one or more unused resources for data transmissions.

16. The method of claim 15, wherein transmitting the signal comprises transmitting the signal in response to the first wireless communication device having no data to transmit beyond that contained in the forwarded reservation signal.

17. The method of claim 16, wherein transmitting the signal comprises transmitting the signal in response to the first wireless communication device having no data to transmit beyond that contained in the forwarded reservation signal, based on a network-configured data traffic condition threshold.

18. The method of claim 15, wherein transmitting the signal comprises transmitting the signal in a second stage of a 2-stage Sidelink Control Information (SCI) transmission.

19. The method of claim 18, further comprising:

modulating and encoding the second stage of the 2-stage SCI transmission in accordance with a most robust modulation and coding scheme available to the first wireless communication device.

20. The method of claim 18, further comprising:

modulating and encoding the second stage of the 2-stage SCI transmission in accordance with a same modulation and coding scheme used to modulate and encode a first stage of the 2-stage SCI transmission.

\*    \*    \*    \*    \*